US012561804B2

(12) United States Patent
Vija et al.

(10) Patent No.: US 12,561,804 B2
(45) Date of Patent: Feb. 24, 2026

(54) CALIBRATION OF ACTIVITY CONCENTRATION UPTAKE

(71) Applicant: Siemens Medical Solutions USA, Inc., Malvern, PA (US)

(72) Inventors: Alexander Hans Vija, Evanston, IL (US); Francesc Dassis Massanes Basi, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 217 days.

(21) Appl. No.: 18/459,469

(22) Filed: Sep. 1, 2023

(65) Prior Publication Data

US 2025/0078257 A1      Mar. 6, 2025

(51) Int. Cl.
| | |
|---|---|
| *G06T 7/48* | (2017.01) |
| *G06T 7/00* | (2017.01) |
| *G06T 11/00* | (2006.01) |

(52) U.S. Cl.
CPC .......... *G06T 7/0012* (2013.01); *G06T 11/001* (2013.01); *G06T 2207/10028* (2013.01); *G06T 2207/30096* (2013.01)

(58) Field of Classification Search
CPC ................ G06T 7/0012; G06T 11/001; G06T 2207/10028; G06T 2207/30096
See application file for complete search history.

(56) References Cited

U.S. PATENT DOCUMENTS

| | | | | |
|---|---|---|---|---|
| 7,865,000 B2 * | 1/2011 | Yokoyama | ............ | G06T 7/0012 |
| | | | | 382/128 |
| 8,045,677 B2 * | 10/2011 | Movassaghi | ............. | A61B 6/04 |
| | | | | 378/205 |
| 8,885,906 B2 * | 11/2014 | Weitzel | ................ | G06T 7/0012 |
| | | | | 382/131 |
| 8,992,231 B2 * | 3/2015 | Betrouni | ................ | G09B 23/32 |
| | | | | 434/262 |
| 9,008,382 B2 * | 4/2015 | Highnam | .............. | G06T 7/0012 |
| | | | | 382/128 |
| 9,811,904 B2 * | 11/2017 | Lambin | ................ | G06T 7/0012 |
| 9,892,526 B2 * | 2/2018 | Hirai | ..................... | G06T 11/003 |
| 9,927,538 B2 * | 3/2018 | Bordy | .................... | B33Y 50/02 |
| 9,937,357 B2 * | 4/2018 | Szasz | ..................... | A61B 5/483 |
| 9,962,561 B2 * | 5/2018 | Meir | ........................ | G06T 7/85 |
| 10,573,201 B2 * | 2/2020 | Tian | ..................... | G09B 23/285 |
| 10,699,445 B2 | 6/2020 | Vija et al. | | |
| 10,849,571 B2 * | 12/2020 | Trindade Rodrigues | .................... | |
| | | | | A61B 6/467 |
| 10,874,880 B2 * | 12/2020 | Ovejero Mayoral | ........................ | |
| | | | | A61N 5/1071 |

(Continued)

FOREIGN PATENT DOCUMENTS

| | | | | |
|---|---|---|---|---|
| WO | WO-2018052447 A1 * | 3/2018 | ............. | A61B 6/585 |

OTHER PUBLICATIONS

Lambin, P., Leijenaar, R., Deist, T. et al. Radiomics: the bridge between medical imaging and personalized medicine. Nat Rev Clin Oncol 14, 749-762 (2017).

(Continued)

*Primary Examiner* — Cheng Yuan Tseng

(57)      ABSTRACT

A framework for calibrating activity concentration uptake. The framework generates a pattern that represents a volume of interest. A three-dimensional (3D) phantom may be printed based on the pattern. Activity concentration uptake in the volume of interest may then be calibrated by using the 3D phantom.

20 Claims, 5 Drawing Sheets

(56) References Cited

U.S. PATENT DOCUMENTS

| | | | | |
|---|---|---|---|---|
| 11,285,483 B2 * | 3/2022 | Kikuchi | | G01N 15/1434 |
| 11,340,364 B2 * | 5/2022 | Hofmann | | A61B 6/583 |
| 11,361,478 B2 | 6/2022 | Vija et al. | | |
| 11,657,499 B2 * | 5/2023 | Kim | | G16H 30/40 |
| | | | | 382/131 |
| 11,748,859 B2 * | 9/2023 | Liu | | A61B 6/583 |
| | | | | 382/131 |
| 11,883,686 B2 * | 1/2024 | Kim | | G01T 1/023 |
| 11,904,182 B2 * | 2/2024 | Ni | | A61N 5/1039 |
| 11,938,344 B2 * | 3/2024 | Kaiser | | A61N 5/1049 |
| 11,986,678 B2 * | 5/2024 | Mead | | A61N 5/1049 |
| 2010/0101181 A1 * | 4/2010 | Hamm-Dubischar | | |
| | | | | B62D 29/008 |
| | | | | 52/793.11 |
| 2010/0239144 A1 * | 9/2010 | Fichtinger | | A61B 6/032 |
| | | | | 382/131 |
| 2015/0282781 A1 * | 10/2015 | Rohler | | A61B 6/582 |
| | | | | 378/207 |
| 2016/0025685 A1 * | 1/2016 | Suita | | G01N 21/1702 |
| | | | | 29/428 |
| 2018/0158201 A1 * | 6/2018 | Thompson | | A61B 8/12 |
| 2018/0263595 A1 * | 9/2018 | Goksel | | A61B 8/085 |
| 2018/0368786 A1 * | 12/2018 | Lee | | G01T 1/2921 |
| 2019/0130791 A1 * | 5/2019 | Qiu | | G09B 23/30 |
| 2021/0097677 A1 * | 4/2021 | Highnam | | G16H 30/40 |
| 2022/0322940 A1 * | 10/2022 | Trakic | | A61B 5/05 |
| 2023/0055103 A1 * | 2/2023 | Soucek | | A61K 51/088 |
| 2023/0125320 A1 * | 4/2023 | Yan | | A61B 6/502 |
| | | | | 378/62 |
| 2023/0162621 A9 * | 5/2023 | Shono | | A61B 34/10 |
| | | | | 434/262 |
| 2023/0168081 A1 * | 6/2023 | Gu | | G06T 7/85 |
| | | | | 356/603 |
| 2023/0324485 A1 * | 10/2023 | Dubois | | G01R 33/5659 |
| | | | | 324/300 |
| 2023/0334658 A1 * | 10/2023 | Ali | | G06T 7/0012 |
| 2024/0001153 A1 * | 1/2024 | Seeber | | A61B 6/583 |
| 2024/0012081 A1 * | 1/2024 | Puiseux | | G01R 33/56308 |

OTHER PUBLICATIONS

Mauro Tambasco, Anthony M. Magliocco, Relationship between tumor grade and computed architectural complexity in breast cancer specimens, Human Pathology, vol. 39, Issue 5, 2008, pp. 740-746.

Baish JW, Jain RK. Fractals and cancer. Cancer Res. Jul. 15, 2000;60(14):3683-8. PMID: 10919633.

Honeth, Gabriella, et al. "Models of breast morphogenesis based on localization of stem cells in the developing mammary lobule." Stem Cell Reports 4.4 (2015): 699-711.

Ryan JJ, Dows BL, Kirk MV, Chen X, Eastman JR, Dyer RJ, Kier LB. A systems biology approach to invasive behavior: comparing cancer metastasis and suburban sprawl development. BMC Res Notes. Feb. 1., 2010;3:36.

Gupta A, Sharma P, Patel CD, et al. Size-dependent thresholding as an optimal method for tumor vol. delineation on positron emission tomography-computed tomography: A Phantom study. Indian Journal of Nuclear Medicine : IJNM : the Official Journal of the Society of Nuclear Medicine, India. Jan. 2011;26(1):22-26.

Ryan, John J., et al. "A systems biology approach to invasive behavior: comparing cancer metastasis and suburban sprawl development." BMC research notes 3.1 (2010): 1-13.

Kikuchi, A., et al. "3-D fractal tumor growth of epithelial ovarian cancer." European journal of gynaecological oncology 27.6 (2006): 561-565.

Baish, James W., and Rakesh K. Jain. "Fractals and cancer." Cancer research 60.14 (2000): 3683-3688.

Lambin, Philippe, et al. "Radiomics: extracting more information from medical images using advanced feature analysis." European journal of cancer 48.4 (2012): 441-446.

* cited by examiner

200

CALIBRATION OF ACTIVITY CONCENTRATION UPTAKE

TECHNICAL FIELD

The present disclosure generally relates to medical devices, and more particularly, to calibration of activity concentration uptake.

BACKGROUND

The field of medical imaging has seen significant advances since the time X-Rays were first used to see the inside of the human body. Nuclear medicine and molecular imaging is a type of medical imaging that is used to visualize how the body is functioning. In nuclear medicine and molecular imaging procedures, a radioactive tracer is introduced into the body, where it gets incorporated in a specific tissue, organ or process and is then detected by an external device (e.g., single photon emission computed tomography or SPECT scanners) to provide information on organ function and cellular activity.

Radiomics is viewed as a bridge between medical imaging and personalized medicine. See Lambin, P., Leijenaar, R., Deist, T. et al. Radiomics: the bridge between medical imaging and personalized medicine. *Nat Rev Clin Oncol* 14, 749-762 (2017), which is herein incorporated by reference. Radiomics is a method that extracts a large number of quantitative radiomic features from medical images using data-characterization algorithms. Radiomic features capture tissue and lesion characteristics, such as heterogeneity and shape, which may be used for clinical problem solving.

However, the medical imaging system may create structural noise patterns that can overwhelm the signal in radiomics. For instance, SPECT images have especially poor resolution that makes it difficult to actually detect any structure on the cellular level. Similarly, positron emission tomography (PET) yields a low resolution in the range of millimeters, in similar order of magnitude as SPECT. The underlying biological structures may be several orders of magnitude smaller than the resolution provided by these modalities.

For instance, a tumor, regardless of stage, can be considered as a convex object with impenetrable walls containing a uniform distribution of activity A in some volume V. The activity A' measured based on reconstructed SPECT (or PET) images may be underestimated due to the partial volume effect. Typically, the measured activity A' is less than the actual activity A due to the partial volume effect. The partial volume effect may be corrected based on anatomical information. See, for example, U.S. Pat. No. 10,699,445B2, which is herein incorporated by reference. An effective value was introduced to account for the fact that activity is not uniformly distributed in a tumor.

Activity binds to specific cells in a clustered structure or fibers in fibroblast activation protein inhibitor (FAPI) imaging. These structures are well below the resolution of the imaging modality, yet they may have effect on the estimation of partial volume correction and contribute to structural noise, thereby confusing or marring radiomic features. Unless the structural noise is compensated for in a radiomics analysis, it is not likely to yield much derivative voxel information beyond simple 0th and 1st moments.

SUMMARY

Described herein is a framework for calibration of activity concentration uptake. The framework generates a pattern that represents a volume of interest. A three-dimensional (3D) phantom may be printed based on the pattern. Activity concentration uptake in the volume of interest may then be calibrated by using the 3D phantom.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
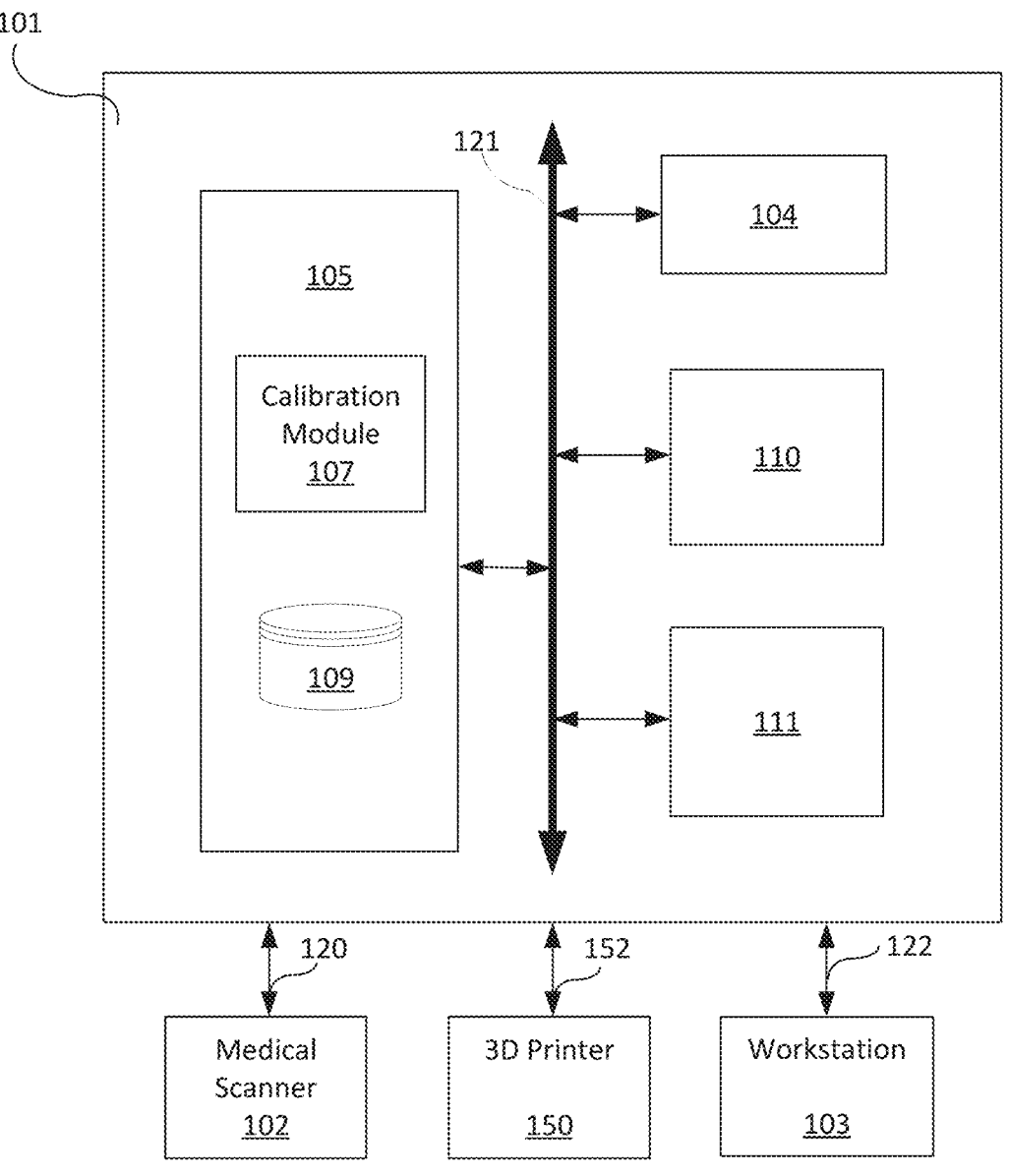
FIG. 1 is a block diagram illustrating an exemplary system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed; on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance. Independent of the grammatical term usage, individuals with male, female or other gender identities are included within the term.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MRI, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one skilled in the art. The image may also be provided from non-medical contexts, such as, for example, remote sensing systems, electron microscopy, etc. Although an image can be thought of as a function from $R^3$ to R, or a mapping to $R^3$, the present methods are not limited to such image and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

One aspect of the present framework enables calibration of meaningful partial volume correction of biological tissue and the effect of underlying yet not directly measurable structures. Such calibration may be performed using a printed three-dimensional (3D) phantom that acts as the negative volume for activity concentration. The 3D phantom may have a fractal pattern that is similar to actual tumor structures observed under high resolution imaging. Such 3D phantoms can be used in simulations as well as measurements. They can be used to assess noise patterns and image responses of the medical imaging system and its image reconstruction method, thereby facilitating calibration for radiomics use. These and other features and advantages will be described in more detail herein.

FIG. 1 is a block diagram illustrating an exemplary system 100. System 100 includes a computer system 101 for implementing the framework as described herein. In some implementations, computer system 101 operates as a stand-alone device. In other implementations, computer system 101 may be connected (e.g., using a network) to other machines, such as medical scanner 102, workstation 103 and 3D printer 150. In a networked deployment, computer system 101 may operate in the capacity of a server (e.g., thin-client server), a cloud computing platform, a client user machine in server-client user network environment, or as a peer machine in a peer-to-peer (or distributed) network environment.

In some implementations, computer system 101 comprises a processor or central processing unit (CPU) 104 coupled to one or more non-transitory computer-readable media 105 (e.g., computer storage or memory device), a display device 110 (e.g., monitor) and various input devices 111 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in non-transitory computer-readable media 105. In particular, the present techniques may be implemented by a calibration module 107.

Non-transitory computer-readable media 105 may include random access memory (RAM), read-only memory (ROM), magnetic floppy disk, flash memory, and other types of memories, or a combination thereof. The computer-readable program code is executed by CPU 104 to process data retrieved from, for example, medical device 120, workstation 103 and database 109. As such, computer system 101 is a general-purpose computer system that becomes a specific-purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 105 may be used for storing a database (or dataset) 109. Such data may also be stored in external storage or other memories. The external storage may be implemented using a database management system (DBMS) managed by the CPU 104 and residing on a memory, such as a hard disk, RAM, or removable media. The external storage may be implemented on one or more additional computer systems. For example, the external storage may include a data warehouse system residing on a separate computer system, a cloud platform or system, a picture archiving and communication system (PACS), or any other hospital, medical institution, medical office, testing facility, pharmacy or other medical patient record storage system.

Workstation 103 may include a tablet, mobile device, laptop or computer intended to be used by the medical technician. Workstation 103 may include a graphical user interface to receive user input via an input device (e.g., keyboard, mouse, touch screen, voice or video recognition interface) to input medical data 122. Workstation 103 can be operated in conjunction with the entire system 100. For example, workstation 103 may communicate directly or indirectly with the medical scanner 102 and/or 3D printer 150.

Medical scanner 102 is a radiological scanner that acquires medical image data 120 associated with patients. Medical scanner 102 may acquire medical image data 120 using techniques such as, but not limited to, high-resolution computed tomography (HRCT), magnetic resonance (MR) imaging, computed tomography (CT), helical CT, X-ray, angiography, positron emission tomography (PET), fluoroscopy, single photon emission computed tomography (SPECT), or a combination thereof.

3D printer 150 is used to create a phantom for medical applications. The phantom is an artificially manufactured structure that has properties (e.g., geometry, degree of softness) that are similar to those of biological tissues, including normal and diseased tissues (e.g., tumor-embedded tissue). 3D printer 150 receives data 152 from the calibration module 107 to print the phantom. It should be understood by one skilled in the art that many different models of 3D printers 150 can be used to accomplish the 3D printing of phantoms that may be used in medical applications. Further, it should be understood that several types of 3D printing processes can be used to produce these parts. One type of 3D printing process that may be used is selective laser sintering (SLS). Other 3D printing processes, such as stereolithography (SLA), fused deposition modeling (FDM), selective laser melting (SLM), electronic beam melting (EBM) or laminated object manufacturing (LOM), may also be used. Other 3D printing processes may also be used, as long as they can produce 3D printed phantoms that are liquid-fillable and watertight (i.e., non-leaking) with photon interaction properties similar to the respective biological tissue of interest.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
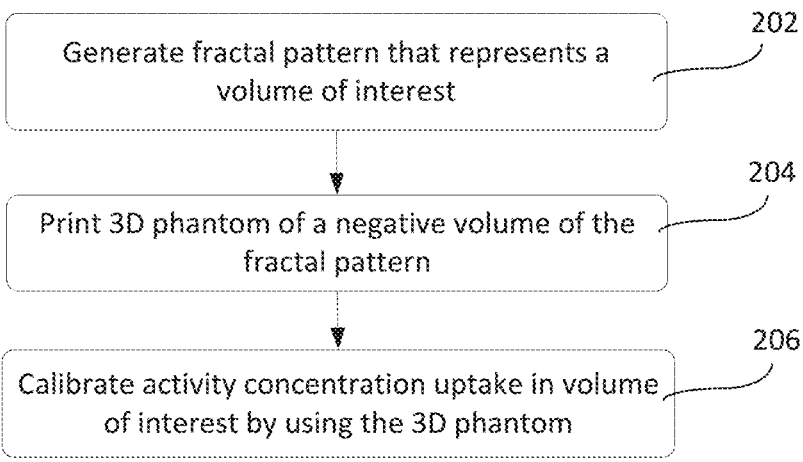
FIG. 2 shows an exemplary method of calibration.

FIG. 2 shows an exemplary method 200 of calibration. It should be understood that the steps of the method 200 may be performed in the order shown or a different order. Additional, different, or fewer steps may also be provided. Further, the method 200 may be implemented with the system 100 of FIG. 1, a different system, or a combination thereof.

At 202, calibration module 107 generates a fractal pattern that represents a volume of interest. The fractal pattern contains detailed structures that are much smaller (e.g., nanometer range) than the spatial resolution (e.g., 0.3 to 0.6 mm) of the medical scanner 102. The volume of interest may be, for example, a tumor-embedded tissue, mammary nodule, liver, or any other organ or tissue identified for further study. The fractal pattern may represent, for example, vasculature or epithelial structures within the volume of interest.

The fractal pattern is a geometric shape that contains detailed structure that appears self-similar at various scales. The growth of tumors in nature at any scale seems to follow similarity laws. As such, fractal patterns may well describe some specific growth of tumors. Examples of the fractal pattern include, but are not limited to, a fractal tree, polygon, Koch snowflake or curve, the Hilbert curve (or Hilbert space-filling curve), Peano curve, or combination thereof. For example, the Hilbert curve is a continuous fractal space-filling curve that is constructed as a limit of piecewise linear curves. The fractal pattern may be generated by, for example, applying an iterative process to simple equations by generative recursion, by using iterated function systems or quaternion algebra. Other fractal generation algorithms may also be used.

The fractal pattern may be characterized by a fractal dimension. A fractal dimension is an index for characterizing fractal patterns or sets by quantifying their complexity as a ratio of the change in detail to the change in scale. Fractal dimension differs from our intuitive notion of topological dimension in that it can be a non-integer value. The more irregular and complex an object is, the higher its fractal dimension relative to its topological dimension. The invariance of the fractal pattern may be scaled using the fractal dimension.

The fractal dimension may be correlated with the progression of tumor tissue. See, for example, Mauro Tambasco, Anthony M. Magliocco, *Relationship between tumor grade and computed architectural complexity in breast cancer specimens*, Human Pathology, Volume 39, Issue 5, 2008, Pages 740-746, which is herein incorporated by reference. Tumor progression may be represented by a tumor grade (e.g., grade 1, 2 or 3), which describes how abnormal cancer cells and tissue look and how fast they are likely to grow. Tumor progression may also be represented by a tumor stage, which measures the size and extent of the cancer in the body.

Figure 3A:
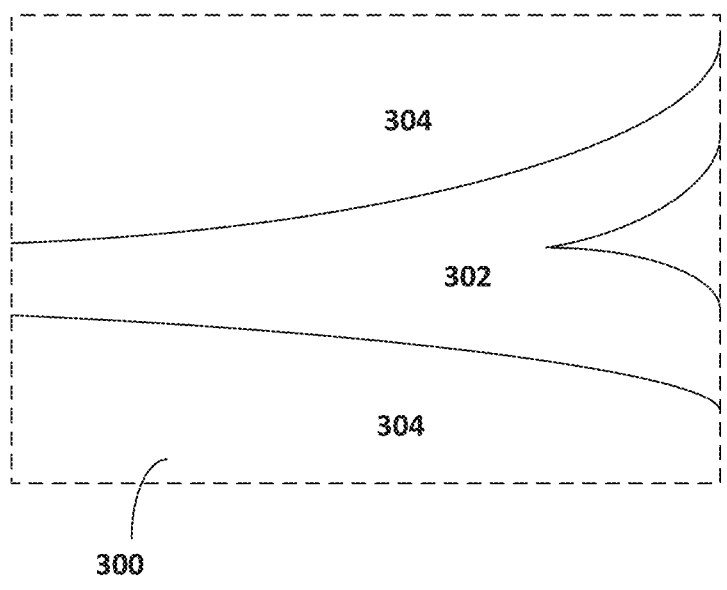
FIG. 3a shows an exemplary graphical representation of normal tissue.
Figure 3B:
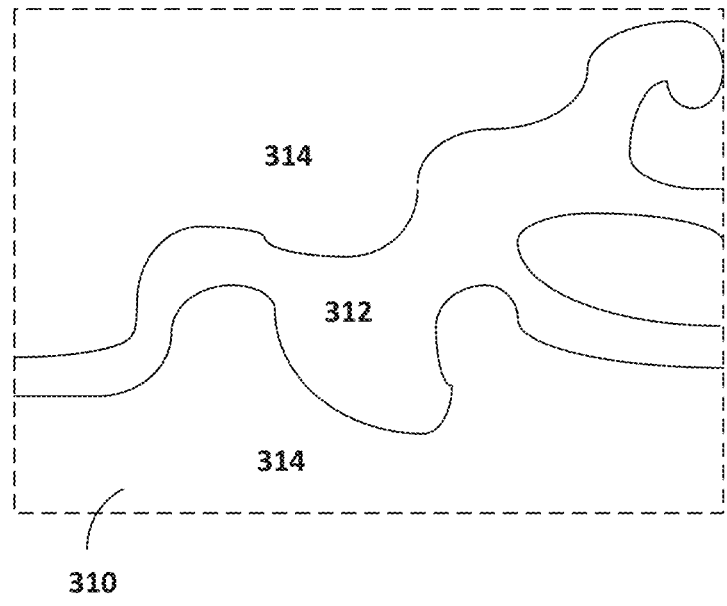
FIG. 3b shows an exemplary graphical representation of tumor tissue.

FIG. 3*a* shows an exemplary graphical representation of normal tissue 300 and FIG. 3*b* shows an exemplary graphical representation of tumor tissue 310. The normal tissue 300 includes blood vessels 302 and surrounding tissue 304. The tumor tissue 310 includes blood vessels 312 and surrounding tissue 314. It may be observed that the blood vessels 312 are more irregular and meander more than the blood vessels 302 in the normal tissue 300. The higher the tumor grade, the higher the irregularity of the blood vessels in the tumor tissue.

To generate an accurate representation of the volume of interest, the fractal dimension of the fractal pattern may be determined based on the tumor progression within the volume of interest. The fractal dimension may be a non-integer value between, for example, 1 and 3. In some implementations, the fractal dimension increases with the tumor grade of the volume of interest. For example, the fractal dimensions for tumor grades 1, 2 and 3 may be 1.28, 1.40 and 1.56 respectively. Other types of correlations are also possible.

Returning to FIG. 2, at 204, calibration module 107 initiates 3D printer 150 to print a 3D phantom based on the fractal pattern. The 3D phantom defines the negative volume surrounding the fractal pattern for activity concentration. The fractal pattern may be scaled up to accurately represent the volume of interest. The 3D phantom may have solid or open boundaries. The material of the 3D phantom includes, for example, polyactic acid (PVA). Other types of materials are also useful, as long as they compatible with liquid source imaging and photon interaction characteristics similar to biological tissue. In some implementations, the 3D phantom represents tumor tissue. As discussed previously, the fractal pattern may be generated by determining the fractal dimension based on the progression of tumor. Advantageously, such 3D phantom enables a more accurate partial volume correction for tumor tissue than phantoms based on "clean" geometric volumes.

At 206, calibration module 107 calibrates activity concentration uptake in the volume of interest by using the 3D phantom. The 3D phantom may be used to calibrate partial volume as a function of tumor structure as per staging (or biopsy) or Hires imaging. Controlling the negative space by printing the 3D phantom advantageously enables study and calibration of patterns that help in quantitative imaging of small-scale structures with non-uniform partial volume correction. The 3D phantom may also be used in simulation as well as measurements, and also allow for assessment of noise patterns.

In some implementations, the 3D phantom is filled with a known test activity concentration of radioactive tracer. The radioactive tracer fills the positive volume defined by the fractal pattern. A medical image acquisition is carried out by the medical scanner 102 to acquire raw image data. For example, SPECT or PET emission detection is performed on the 3D phantom to generate raw image data that represents measurements or counts of emissions. Image reconstruction is performed based on the raw image data to generate a reconstructed image of the 3D phantom. Forward projection may be used in the image reconstruction. Calibration of activity concentration uptake may be performed based on the reconstructed image.

In some implementations, calibration of activity concentration uptake is performed by scaling and comparing the reconstructed image to a reference (or expected) image to determine corrections for partial volume effect. The calibration factor for correcting partial volume effect may be represented by determining a comparison function value (e.g., difference) of the activity concentration in the reconstructed image with the known test activity concentration. The boundaries of the fractal pattern cause the partial volume effect. The comparison provides corrections to counteract the partial volume effect. See, for example, U.S. Pat. No. 10,699,445B2, which is herein incorporated by reference.

Figure 4:
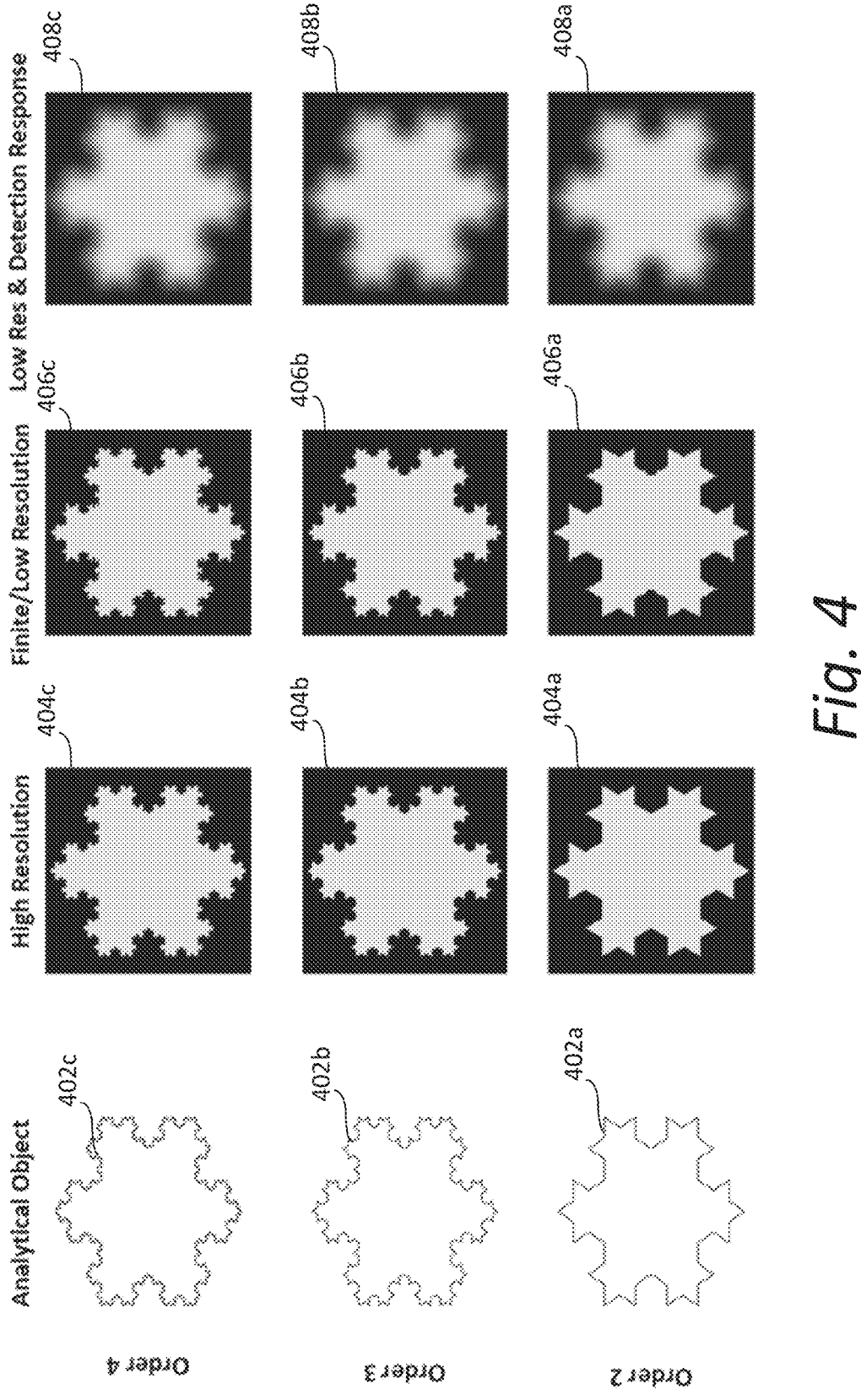
FIG. 4 shows exemplary reconstructed images of a fractal object in different orders.

FIG. 4 shows exemplary reconstructed images (404*a-c*, 406*a-c*, 408*a-c*) of a fractal object in different orders 402*a-c*. Fractal object 402*a-c* may be based on the Koch snowflake (or curve), which is generated iteratively in a sequence of stages. The second, third and fourth iterations may generate different first, second and third fractal objects (402*a*, 402*b*, 402*c*) as shown. Fractal dimensions and/or angles may be adjusted to yield different objects.

3D phantoms based on fractal objects (402*a*, 402*b*, 402*c*) may be printed and used to characterize and calibrate activity concentration in a volume of interest. The positive volume (or background) of the 3D phantom is filled to a known concentration of radioactive tracer. An image acquisition is carried out in the medical scanner 102 to acquire raw image data. Image reconstruction is performed based on the raw image data to generate reconstructed images (404*a-c*, 406 *a-c*, 408 *a-c*) of the phantom. As shown, high resolution image 404*a-c*, finite (or low) resolution images 406*a-c* and low resolution and detection response images 408*a-c* are generated for the first, second and third fractal objects (402*a*, 402*b*, 402*c*). While the area becomes larger and larger at higher orders, the number of counts should be higher if the concentration of the radiotracer was kept the same. However, the blurred low resolution images 408*a-c* seem to be the same, which means a partial volume correction (PVC) calibration factor may be required to retrieve the right counts.

Figure 5:
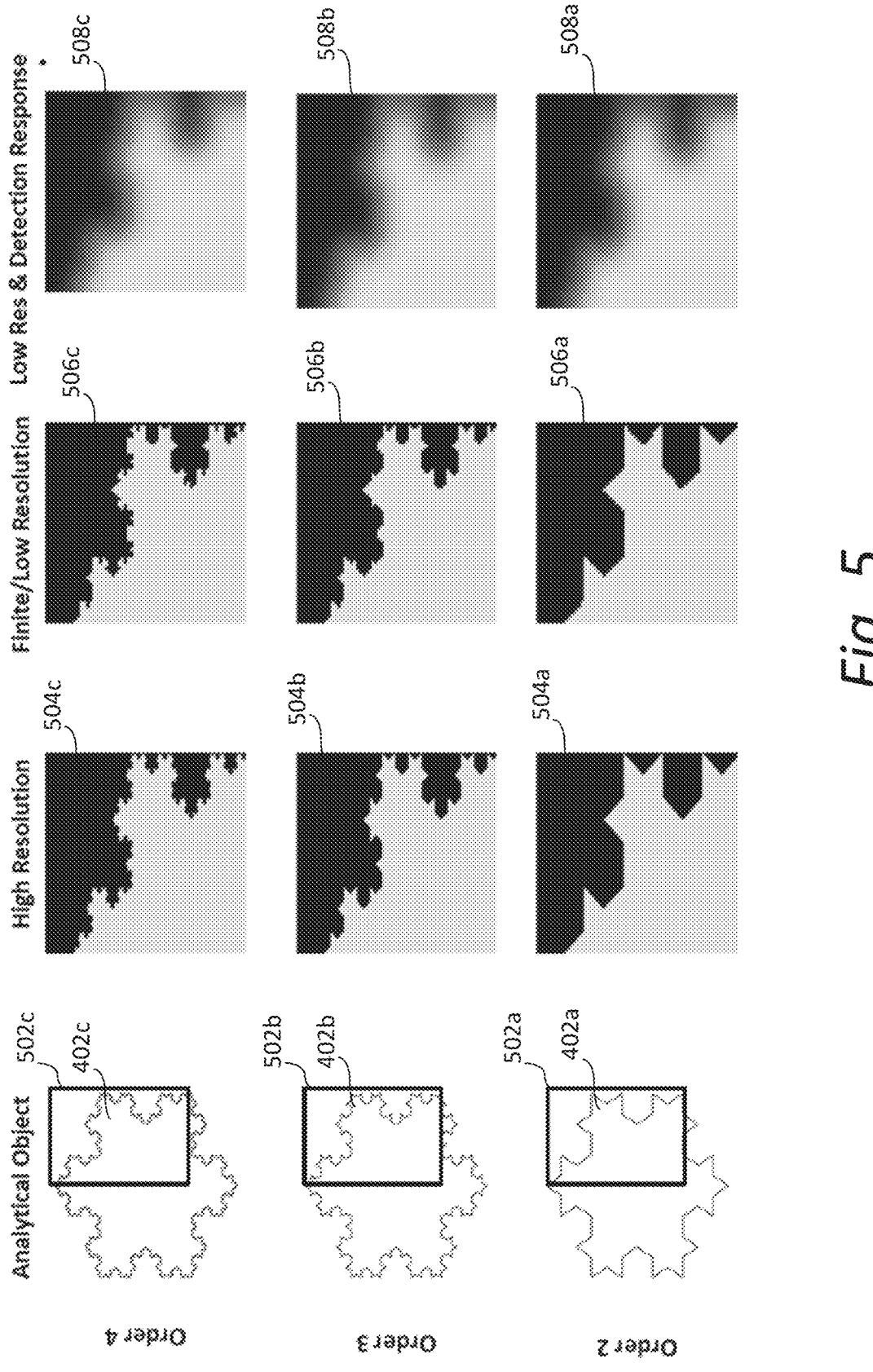
FIG. 5 shows exemplary magnified reconstructed images of a portion of the fractal object in different orders.

FIG. 5 shows exemplary magnified reconstructed images (504*a-c*, 506*a-c*, 508*a-c*) of a portion 502*a-c* of the fractal object in different orders 402*a-c*. By zooming into the portions 502*a-c*, it can be observed that small features may be lost and thus counts misplaced, unless there is a PVC calibration factor.

One or more PVC calibration factors may be determined based on the reconstructed image of the 3D phantom to correct for the partial volume effect. Such calibration factors may be determined by comparing the activity concentration after forward projection in the reconstructed image to the known test activity concentration. Any comparison function may be used, such as a mathematical difference (subtraction) or ratio (e.g., ratio of known test activity concentration to the reconstructed activity concentration after forward projection). Other comparison functions and/or other terms may be included, such as a constant or variable for adjusting an overall level of correction, may be used.

The PVC calibration factor may have a spatial distribution, so a zone map for partial volume corrections may be provided. The PVC zone map provides a distribution of gain counteracting the partial volume effect. The gain is additive or multiplicative. For the ratio, the gain is multiplicative. Detected emissions of the medical scanner 102 from the volume of interest of the patient may be reconstructed using the PVC calibration factors or zone map. Such image reconstruction may include, for example, multiplying the detected emissions by the PVC calibration factors in forward projection of the reconstruction.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

The following is a list of non-limiting illustrative embodiments disclosed herein:

Illustrative embodiment 1: One or more non-transitory computer readable media embodying a program of instructions executable by machine to perform operations for calibration, the operations comprising: generating a fractal pattern that represents a volume of interest, wherein the fractal pattern is characterized by a fractal dimension; printing a three-dimensional (3D) phantom based on the fractal pattern; and calibrating activity concentration uptake in the volume of interest by using the 3D phantom.

Illustrative embodiment 2: The one or more non-transitory computer readable media of illustrative embodiment 1 wherein generating the fractal pattern comprises determining the fractal dimension based on a tumor progression of the volume of interest.

Illustrative embodiment 3: The one or more non-transitory computer readable media of illustrative embodiment 2 wherein the tumor progression is represented by a tumor grade.

Illustrative embodiment 4: The one or more non-transitory computer readable media of any one of illustrative embodiments 1-3 wherein determining the fractal dimension comprises increasing the fractal dimension with the tumor grade.

Illustrative embodiment 5: The one or more non-transitory computer readable media of any one of illustrative embodiments 1-4 wherein the program of instructions is executable by machine to calibrate the activity concentration uptake in the volume of interest by performing a medical image acquisition of the 3D phantom filled with a known test activity concentration of radioactive tracer to generate raw image data, performing image reconstruction based on the raw image data to generate a reconstructed image, and determining one or more calibration factors for correcting partial volume effect based on the reconstructed image.

Illustrative embodiment 6: A method of calibration, comprising: generating a pattern that represents a volume of interest; printing a three-dimensional (3D) phantom based on the pattern; and calibrating activity concentration uptake in the volume of interest by using the 3D phantom.

Illustrative embodiment 7: The method of illustrative embodiment 6 wherein the pattern comprises a fractal pattern.

Illustrative embodiment 8: The method of illustrative embodiment 7 wherein the fractal pattern is characterized by a fractal dimension.

Illustrative embodiment 9: The method of illustrative embodiment 8 wherein generating the pattern comprises determining the fractal dimension based on a tumor progression of the volume of interest.

Illustrative embodiment 10: The method of illustrative embodiment 9 wherein the tumor progression is represented by a tumor grade.

Illustrative embodiment 11: The method of illustrative embodiment 10 wherein determining the fractal dimension comprises increasing the fractal dimension with the tumor grade.

Illustrative embodiment 12: The method of illustrative embodiment 7 wherein generating the fractal pattern comprises generating a Hilbert curve.

Illustrative embodiment 13: The method of any one of illustrative embodiments 6-12 wherein printing the 3D phantom comprises selective laser sintering, stereolithography, fused deposition modeling, selective laser melting, electronic beam melting or laminated object manufacturing.

Illustrative embodiment 14: The method of any one of illustrative embodiments 6-13 wherein calibrating the activity concentration uptake in the volume of interest by using the 3D phantom comprises: performing a medical image acquisition of the 3D phantom filled with a known test activity concentration of radioactive tracer to generate raw image data; performing image reconstruction based on the raw image data to generate a reconstructed image; and determining one or more calibration factors for correcting partial volume effect based on the reconstructed image.

Illustrative embodiment 15: The method of illustrative embodiment 14 wherein determining the one or more calibration factors comprises determining a comparison function value of an activity concentration in the reconstructed image with the known test activity concentration.

Illustrative embodiment 16: The method of illustrative embodiment 15 wherein determining the comparison function value comprises determining a difference.

Illustrative embodiment 17: The method of illustrative embodiment 15 wherein determining the comparison function value comprises determining a ratio.

Illustrative embodiment 18: A system, comprising: a non-transitory memory for storing computer readable program code; and a processor in communication with the non-transitory memory, the processor being operative with the computer readable program code to perform a calibration method comprising: generating a pattern that represents a volume of interest; printing a three-dimensional (3D) phantom based on the pattern; and calibrating activity concentration uptake in the volume of interest by using the 3D phantom.

Illustrative embodiment 19: The system of illustrative embodiment 18 wherein the pattern comprises a fractal pattern.

Illustrative embodiment 20: The system of illustrative embodiment 19 wherein the fractal pattern is characterized by a fractal dimension.

What is claimed is:

1. One or more non-transitory computer readable media embodying a program of instructions executable by machine to perform operations for calibration, the operations comprising:

generating, by applying an iterative process, a fractal pattern that represents a volume of interest, wherein the fractal pattern is a geometric shape that contains detailed structure that appears self-similar at various scales and is characterized by a fractal dimension;

printing a three-dimensional (3D) phantom based on the fractal pattern; and calibrating activity concentration uptake in the volume of interest by performing a medical image acquisition of the 3D phantom filled with a known test activity concentration of radioactive tracer to generate raw image data, performing image reconstruction based on the raw image data to generate a reconstructed image, and determining one or more calibration factors for correcting partial volume effect based on the reconstructed image.

2. The one or more non-transitory computer readable media of claim 1 wherein generating the fractal pattern comprises determining the fractal dimension based on a tumor progression of the volume of interest.

3. The one or more non-transitory computer readable media of claim 2 wherein the tumor progression is represented by a tumor grade.

4. The one or more non-transitory computer readable media of claim 3 wherein determining the fractal dimension comprises increasing the fractal dimension with the tumor grade.

5. The one or more non-transitory computer readable media of claim 1 wherein determining the one or more calibration factors comprises determining a comparison function value of an activity concentration in the reconstructed image with the known test activity concentration.

6. A method of calibration, comprising:

generating, by applying an iterative process, a geometric pattern that represents a volume of interest;

printing a three-dimensional (3D) phantom based on the geometric pattern; and calibrating activity concentration uptake in the volume of interest by performing a medical image acquisition of the 3D phantom filled with a known test activity concentration of radioactive tracer to generate raw image data, performing image reconstruction based on the raw image data to generate a reconstructed image, and determining one or more calibration factors for correcting partial volume effect based on the reconstructed image.

7. The method of claim 6 wherein the geometric pattern comprises a fractal pattern characterized by a fractal dimension.

8. The method of claim 7 wherein the iterative process comprises generative recursion.

9. The method of claim 7 wherein generating the geometric pattern comprises determining the fractal dimension based on a tumor progression of the volume of interest.

10. The method of claim 9 wherein the tumor progression is represented by a tumor grade.

11. The method of claim 10 wherein determining the fractal dimension comprises increasing the fractal dimension with the tumor grade.

12. The method of claim 7 wherein generating the fractal pattern comprises generating a Hilbert curve.

13. The method of claim 6 wherein printing the 3D phantom comprises selective laser sintering, stereolithography, fused deposition modeling, selective laser melting, electronic beam melting or laminated object manufacturing.

14. The method of claim 6 wherein the geometric pattern comprises a fractal tree, a Koch snowflake, a space-filling curve, or combination thereof.

15. The method of claim 6 wherein determining the one or more calibration factors comprises determining a comparison function value of an activity concentration in the reconstructed image with the known test activity concentration.

16. The method of claim 15 wherein determining the comparison function value comprises determining a difference.

17. The method of claim 15 wherein determining the comparison function value comprises determining a ratio.

18. A system, comprising:

a non-transitory memory for storing computer readable program code; and a processor in communication with the non-transitory memory, the processor being operative with the computer readable program code to perform a calibration method comprising:

generating, by applying an iterative process, a geometric pattern that represents a volume of interest;

printing a three-dimensional (3D) phantom based on the geometric pattern; and calibrating activity concentration uptake in the volume of interest by performing a medical image acquisition of the 3D phantom filled with a known test activity concentration of radioactive tracer to generate raw image data, performing image reconstruction based on the raw image data to generate a reconstructed image, and determining one or more calibration factors for correcting partial volume effect based on the reconstructed image.

19. The system of claim 18 wherein the geometric pattern comprises a fractal pattern.

20. The system of claim 19 wherein the fractal pattern comprises a fractal tree, a Koch snowflake, a space-filling curve, or combination thereof.

\* \* \* \* \*